(12) United States Patent
McCullum (10) Patent No.: US 9,890,508 B2
(45) Date of Patent: *Feb. 13, 2018

(54) SPILL CLEAN-UP SYSTEM AND METHOD (71) Applicant: Annihilator Cleaning Equipment, LLC, Fort Worth, TX (US)

(72) Inventor: Erick McCullum, Arlington, TX (US)

(73) Assignee: Annihilator Cleaning Equipment, LLC, Trophy Club, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/129,316

(22) PCT Filed: Mar. 25, 2014

(86) PCT No.: PCT/US2014/031748
§ 371 (c)(1),
(2) Date: Sep. 26, 2016

(87) PCT Pub. No.: WO2015/147805
PCT Pub. Date: Oct. 1, 2015

(65) Prior Publication Data
US 2017/0101752 A1 Apr. 13, 2017

Related U.S. Application Data (63) Continuation-in-part of application No. 12/460,745, filed on Jul. 23, 2009, now Pat. No. 8,677,555.
(Continued)

(51) Int. Cl.
*E01H 1/10* (2006.01)
*E01H 1/00* (2006.01)
(Continued)

(52) U.S. Cl.
CPC ............. *E01H 1/103* (2013.01); *B08B 3/024* (2013.01); *B08B 3/08* (2013.01); *B08B 3/10* (2013.01); *B08B 5/04* (2013.01); *E01H 1/001* (2013.01)

(58) Field of Classification Search
None
See application file for complete search history.

(56) References Cited

U.S. PATENT DOCUMENTS 4,060,487 A    11/1977  Samsel
4,351,723 A  *  9/1982  Palmer ................... B01D 35/26
                                                     15/353
(Continued)

FOREIGN PATENT DOCUMENTS

DE    EP 2210982 A2  *  7/2010  ............. E01H 1/103
FR    2918085 A1  *  1/2009  ............. E01H 1/101

OTHER PUBLICATIONS

English Machine Translation of FR 2918085.*
(Continued)

*Primary Examiner* — Nicole Blan
(74) *Attorney, Agent, or Firm* — James E. Walton (57) ABSTRACT

A mobile cleaning system to be used for cleaning organic liquids from a hard surface includes tanks for storing water, and for storing used, dirty water after cleanup. A water-based cleaner is sprayed onto the spill, which can be, but need not be, done in connection with the cleanup system. A high throughput vacuum system removes the hot water and the spill materials concurrently as the hot water is applied to the treated area. The vacuumed liquids are stored in an on-board tank for later disposal.

6 Claims, 6 Drawing Sheets

Related U.S. Application Data (60) Provisional application No. 61/135,670, filed on Jul. 23, 2008.

(51) Int. Cl.
  *B08B 3/02*    (2006.01)
  *B08B 3/08*    (2006.01)
  *B08B 3/10*    (2006.01)
  *B08B 5/04*    (2006.01)

(56) References Cited

U.S. PATENT DOCUMENTS

| | | | |
|---|---|---|---|
| 4,782,974 A * | 11/1988 | Elkayam | B64D 37/005 |
| | | | 141/285 |
| 4,862,551 A | 9/1989 | Martinez | |
| 5,224,236 A | 7/1993 | Sallquist | |
| 5,500,976 A | 3/1996 | Rohrbacher | |
| 5,711,051 A * | 1/1998 | Roden | A47L 11/03 |
| | | | 15/321 |
| 6,827,383 B2 | 12/2004 | Lacy | |
| 6,896,742 B2 | 5/2005 | Geyer | |
| 7,735,186 B1 | 6/2010 | Vogel | |
| 2003/0004079 A1 | 1/2003 | Aigner | |
| 2014/0010603 A1 | 1/2014 | Blais | |

OTHER PUBLICATIONS

English Machine Translation of EP 2210982.*
Search Report dated Oct. 22, 2014 for parent PCT application PCT/US2014/31748.
International Preliminary Examination Report dated Feb. 19, 2016 for parent PCT application PCT/US2014/31748.

* cited by examiner

SPILL CLEAN-UP SYSTEM AND METHOD

PRIOR APPLICATIONS

This application is a continuation-in-part of U.S. application Ser. No. 12/460,745, filed 23 Jul. 2009, which claims the benefit of U.S. Provisional Application No. 61/135,670, filed 23 Jul. 2008.

TECHNICAL FIELD

The present invention relates generally to environmentally friendly cleaning processes, and more specifically to a system and method for cleaning spills that include liquid organic materials.

DESCRIPTION OF THE PRIOR ART

The passage of the Federal Clean Water Act dictated that all companies regardless of size are now accountable for the recovery, storage and disposal of waste water in an approved manner. Spills, accidents and industrial cleanups must be contained and disposed of.

An example of such a spill includes oils and fuel spilled at the site of a vehicle accident. When automobiles collide, it is common for liquid organic materials to be spilled onto the street, and these materials would create a driving hazard if they are not cleaned up. Inadequate cleaning of fuel and oil spilled onto a roadway can create dangerous slick regions, particularly in response to future rains.

At the present time, when a spill occurs that includes organic or other materials, such as oil, fuels, and other materials, the cleanup process is too complicated and the results not effective enough. Typically, an oil absorbing material is used to soak up the spill; kitty litter is the preferred material for this, but other, similar materials are regularly used.

The absorbent material is spread over the area, swept and then collected. The process is repeated until the excess liquid is absorbed. Depending on the liquid material involved and the size of the spill, this process can take several days over a relatively small area. The amount of waste by-product is significant and stains are left behind.

Such an approach is slow, and collecting the soiled oil absorbing material can be time consuming. Typically, it is a labor intensive process. In addition, the effectiveness of the clean up leaves much to be desired. The current processes have no ability to reach into the pores of the hard surface and extract the oil or other materials trapped beneath the surface. Thus in the case of, for example, an automobile collision, fuel and oil is absorbed in the pores of the concrete at the accident site. Spreading the absorbent material over the surface of the concrete removes only the organic materials that remain on the surface, but leaves much of the organic material that soaks into the concrete. Once the cleanup is complete, the organic material that has soaked in is free to be released onto the upper surface, particular in response to an event such as rain. This makes the surface of the supposedly cleaned roadway very slick and hazardous.

Spills of oil and other organic chemicals in industrial settings generate similar problems. The initial prior art cleanup techniques do not remove the chemicals from beneath the upper surface of the concrete. This means that the organic chemicals slowly rise to the surface over time, causing possibly unsafe conditions that require follow up cleanup activity.

It would be desirable to provide a cleaning system and method that is both faster and easier to use, and is more effective at cleaning spills that include liquid and other organic materials.

Thus, there exists significant room for improvement in the art for overcoming these and other shortcomings of conventional systems and methods for spill clean-up.

BRIEF DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DESCRIPTION OF THE PREFERRED EMBODIMENT

Illustrative embodiments of the spill clean-up system and method are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The process of the application includes a powerful vacuum capable of establishing and maintaining a negative vacuum in a secure holding tank and the equipment attached to the storage/holding tank. The vacuum system is strong enough to vacuum the cleanup site of all excess liquids and small solids that could contaminate adjacent property and storm sewer systems. Additional storage containers can be utilized to contain excess contaminated water and fluids.

After initial containment and cleanup of the spill is effected, a water soluble cleaner is mixed with super-heated clean water and sprayed evenly over the effected area. Preferably, the water is heated to a temperature below boiling, such as approximately 175 degrees F. This thin layer of water based cleaner causes the organic and other materials in the spill to release from the hard surface, and makes them available to be picked up in the second step. Using heated water allows the water based cleaner to penetrate into the pores of the hard surface to effect a significantly more complete, deep cleaning than heretofore obtained.

In the second step heated, clean water is used under pressure and causes the hydrocarbon molecules to release from the hard surface. Utilizing a containment hood the residue is washed with super-heated clean water under high pulsating pressure and vacuumed all in the same operation. The clean high pressure water cleans deep into the hard surface's pores, and the vacuum dries it all up in one pass. The vacuum sucks all the liquids into the containment tank ready to be transported to the appropriate treatment site.

The various steps of the preferred process will now be discussed in more detail. First, after a spill or accident occurs the area generally must be contained, which defines the treatment area. In the process of the present application, a retaining dam, if necessary, is built around the area and effectively prevents the spilled material from spreading. If there is solid material inside the contained area, it is swept into piles and loaded into drums or appropriate containers, then loaded onto trucks for disposal. After the area has been swept and cleaned, normally there is some degree of environmentally sensitive liquids remaining within the treatment area.

In the process of the present application, the liquids remaining pooled on the surface are quickly and efficiently vacuumed into storage tanks especially designed for environmentally hazardous liquids. The vacuum holding tanks are made of a strong and dense material, and are especially constructed to insure that contaminated liquids cannot escape from the tank until the appropriate transport containers are ready. The tanks are held in a constant state of negative pressure, insuring that the contaminated liquid cannot escape from the holding tank except through controlled conditions such as at a disposal facility.

No water or absorbing materials are added to the process at this time, the contaminated liquids are merely vacuumed into the holding tanks. The time frame is cut into minutes instead of days and the additional hazardous waste refuse is eliminated.

As soon as the spill surface is vacuumed relatively dry, a water soluble solution is mixed with a small amount of heated water via mixing wands and sprayed evenly over the contaminated area. The amount of water based cleaner and water sprayed on the surface is enough to wet the surface, but not enough to create runoff. The diluted water soluble solution sits over the area and the water portion of the solution begins to expire. Depending upon the viscosity and chemical composition of the spilled material in question, the water soluble based cleaner is allowed to set upon the spoiled surface and begin to chemically and physically release the spilled material from the hard surface to which it has attached.

A suitable water soluble cleaner that can be used for this purpose includes the following materials in approximately the following proportions: water—82%; sodium metasilicate penta (an alkaline builder) 2%; tergitol NP 9 (a water based surfactant)—3%; sodium hydroxide—6%; Mayoquest (a water softener and wetting agent)—1%.

After the solvent has set, super-heated clean water is then applied at high pressure to the spoiled area, completing the releasing process. This heated water is simultaneously vacuumed dry and clean by the same vacuum system that removed the original liquid waste. Using water heated to a little less than boiling, such as approximately 175 degrees, and sprayed onto the surface at high pressure allows the surface to be cleaned well below the surface area. The hot water sprayed under the high pressure removes organic material from porous materials, such as concrete, for some distance below the upper surface.

With prior art removal techniques, organic liquid materials could be removed from the top surface of concrete and similar materials, but such treatments do not adequately remove the organic liquids from beneath the top surface. Over time, theses organic liquids seep back up to the top surface, and can cause problems. For example, if oil spilled onto a roadway after a traffic accident is only cleaned from the upper surface of the roadway, oil from below the surface can migrate back to the surface over time. This can cause a slick region on the roadway for a significant period of time after the accident, in particular after a rain.

With the technique described herein, cleaning is effected below the top surface of the concrete. Thus, in cases such as fuel spills on concrete, the deep cleaning results in a surface that does not become re-contaminated and thus cause unsafe road conditions from the initial spill, which is the case if only the top surface is cleaned.

For small to medium sized spills, a 500 gallon vacuum tank is sufficiently to collect everything that is vacuumed up. If the contaminated area is larger that the 500 gallon capacity of the vacuum tank, then extra 500 gallon plastic tanks, preferably encased in wire mesh, are connected to the vacuum holding tank and used to drain it. Once the vacuum tank is emptied the process continues. The surface is returned to its original color and texture. After the vacuuming process is completed, the containing dam, is removed and the job is complete.

The total process usually takes less than two hours and the road or affected area is returned to service in a fraction of the time and expense experienced in conventional methods. The amount of contaminated waste is geometrically reduced with no run off except for that generated by the initial spill itself. The cleaner formula is non-toxic and presents no personnel issues that aren't washed away with clean water.

Figure 1:
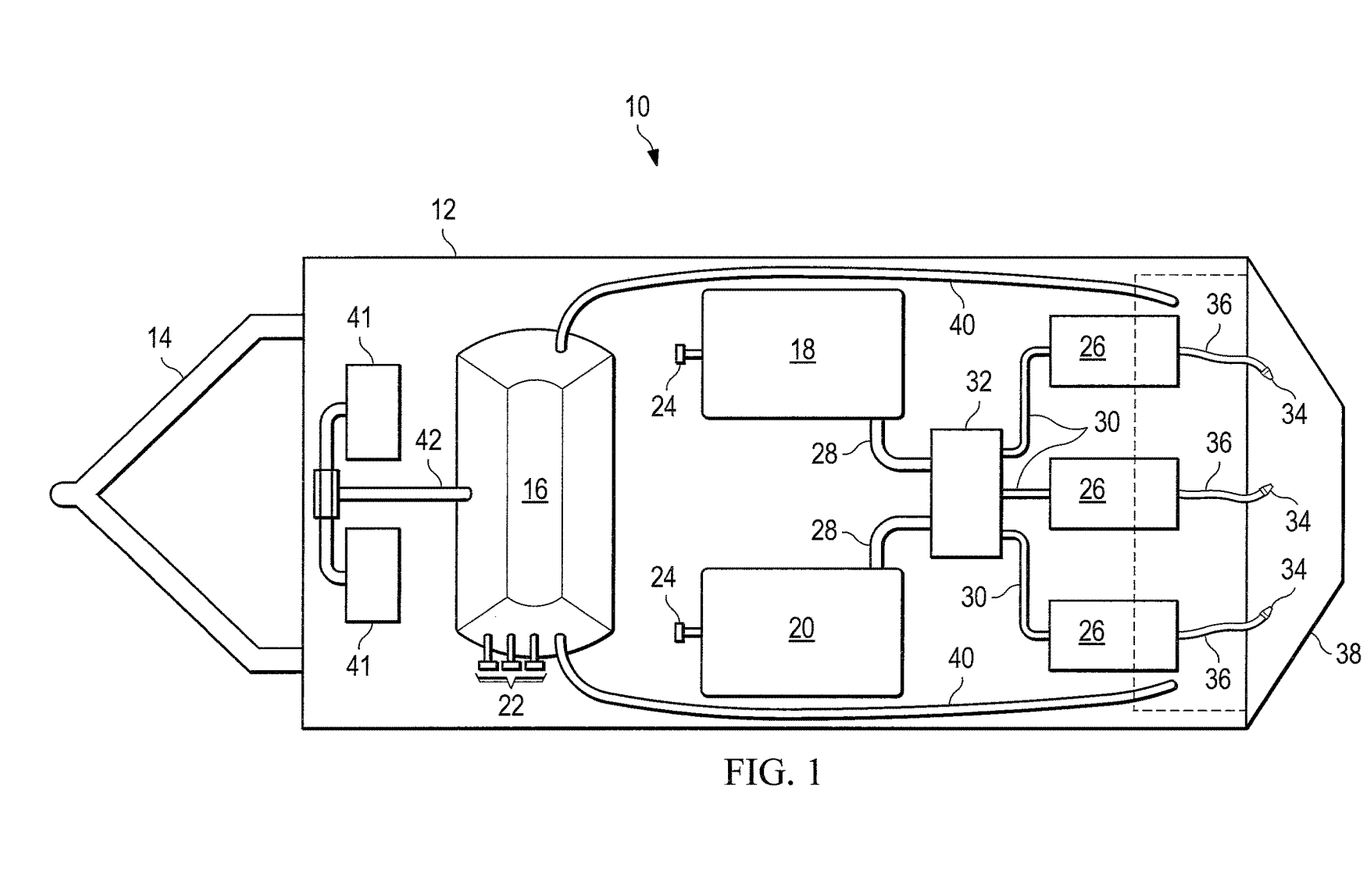
FIG. 1 is a plan diagram of a trailer for use with a preferred embodiment according to the present application.

The system is preferably mounted on a truck or trailer to make it portable. As shown in FIG. 1, one preferred embodiment is a trailer on which all the equipment need to effect clean up can be mounted. A similar arrangement can be made using a truck, as is describe below in connection with FIG. 2. Both designs allow a clean up to be performed by a small clean up crew, in many cases a single person.

As shown in FIG. 1, a trailer mounted cleaning system 10 in accordance with the present application includes a bed 12 on which equipment is located, and a tow hitch 14 for pulling the trailer in the normal way. This embodiment of a cleaning system includes a single vacuum storage tank 16 having walls thick enough to withstand atmospheric pressure against a vacuum. Clean water storage tanks 18, 20 are used to store and provide clean water used in the cleaning process Preferably, vacuum storage tank 16 has a capacity of approximately 500 gallons, but any other size that will be suitable for a particular task may be used. Several valves 22 are provided on the vacuum storage tank 16 so that liquid and small debris can be removed, and the system purged as needed. During use, if the storage tank 16 should become filled, the vacuum can be released and the liquid and debris pumped out of the valves 22 into one or more waste storage tanks (not shown) for removal.

Clean water storage tanks may have a capacity of approximately 325 gallons each, although other volumes can be used if desired. Also, while two tanks are shown in the drawing as suitable for use due to weight balancing reason, one tank, or more than two tanks, can be used if desired. Tanks 18, 20 are also provided with valves 24 by which the tanks can easily be refilled if needed.

Three heater/compressor units 26 are connected to the water storage tanks 18, 20 by an arrangement of pipes (or hoses) 28, 30 and valves 32 that enable water to be supplied to the units 26 on demand. Units 26 heat incoming water to approximately 150-200 degrees F. (slightly below boiling so that steam is not generated) and provide it under a pressure of at least approximately 3,500 psi to washer unit nozzles 34 though night pressure hoses 36. Three high pressure nozzles 34 are shown in the drawing, but any suitable number can be used. These nozzles provide a relatively uniform spray at high pressure down to the surface on which the trailer is rolling, enabling hot water to penetrate beneath the porous surface.

The high pressure spray can be created by directing water at preferably 3,500 lbs/square inch or greater into three bearing, spinning them and creating the super agitation necessary to complete the removal process. Other set-ups that provide a high pressure water spray can also be used. The bearings used to generate the high pressure spray are incorporated into a retractable vacuum hood 38 which is lowered close to the ground, and includes a skirt to prevent water and other material from escaping. Also connected to the vacuum hood 38 are several vacuum lines 40 that are used to retrieve water, organic liquids, and other debris, and return them to vacuum storage tank 16. Having the orifices located a distance from the nozzles, as well as, having inflow from underneath the skirt of the vacuum hood creates an uplift under the vacuum hood 38 improving the removal of materials from the hard surface. These materials are vacuumed away at the same time as water is being sprayed under high pressure into the contaminated surface; this ensures that these materials do not escape from underneath the hood.

Vacuum is created on the vacuum storage tank by one or more vacuum systems 41 connected to tank 16 by suitable piping 42. A single system can be used if desired; two vacuum systems 41 provide backup and system operability in case of a single system failure. Preferably, one or more generators are provided (not shown) to power the equipment described above, although any other desired means for providing power can be used.

In use, at the spill site, if necessary a dam is constructed to prevent runoff. Larger sold debris is removed by being swept into piles and removed as is done in the prior art. The vacuum hood can be used to pick up spilled liquids and small solid debris by pulling the trailer over the accident site, lowering the vacuum hood 38 to the ground, and operating the vacuum system. Heater clean water is not used at this stage.

Next, the water based cleaner described above, or other suitable solvent for the spilled material is sprayed over the spill site and allowed to set. The time needed to set is generally only a few minutes. Then, the trailer is pulled over the spill site with the vacuum system and hot water system operating, to spray hot, pulsating water under the hood and remove the water and spilled organic liquids and other materials. After the trailer has passed, the concrete surface is very clean, and retains it original look. No residue is left behind, and the concrete is cleaned beneath its top surface. The trailer creates a clean swath as it is pulled, and several passes may be needed to cover the entire spill area. Generally, only one cleaning pass is required to effectively clean the spill site, but if desired or needed the process can be repeated.

An alternative embodiment is configured for use at refineries. Typically refineries process many different highly flammable and explosive hydro-carbon based chemicals. Over time these chemicals are occasionally spilled and require cleanup. Considering the critical need to prevent sparks at refineries, the alternative embodiment separates the sprayers and the vacuum tank from the heaters, compressors, vacuum pump, and power generators. They are interconnected by a long distance set of vacuum and water lines. The powered part of the system would remain outside the refinery and the rest of the system connected by the long lines would allow a user to spray and remove the hydro-carbons from inside the refinery without sparks. Furthermore, the system can be augmented with compressed air tanks of sufficient quantity to power the system without any combustion along with preheating the water in the clean water storage tanks.

Figure 2:
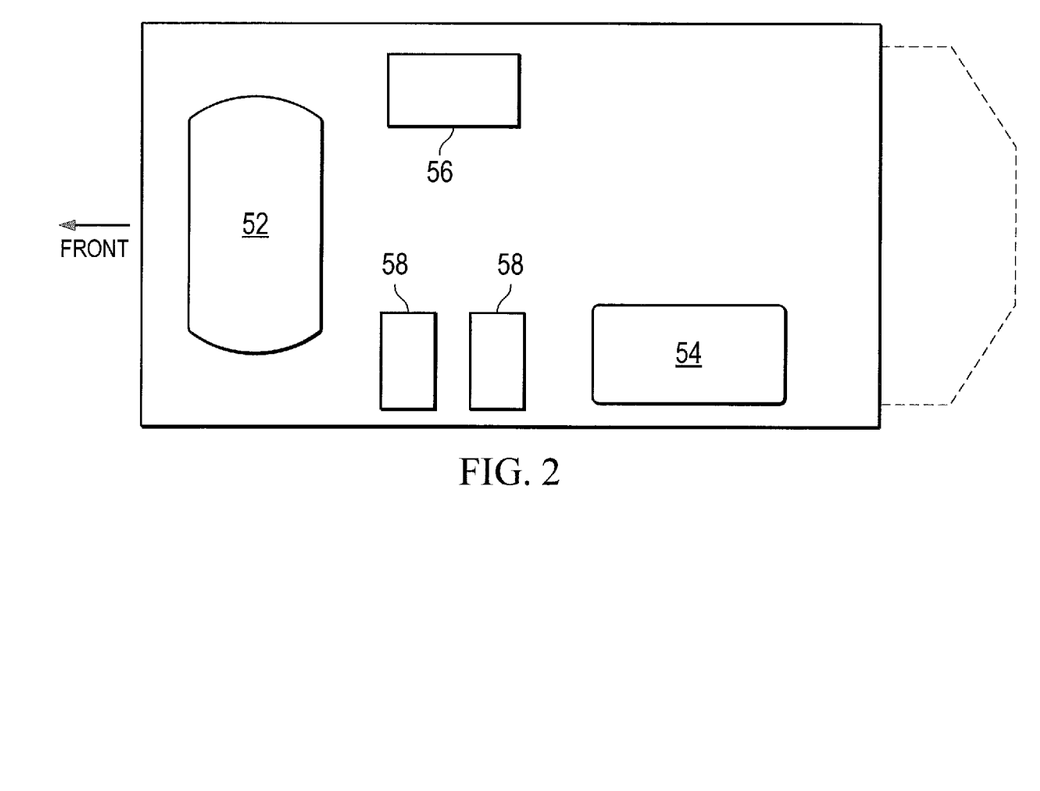
FIG. 2 is a plan diagram of a truck mounted version of the preferred embodiment according to the present application.

A similar system can be mounted on a truck if desired, rather than a trailer. FIG. 2 illustrates a plan layout of a truck bed that includes equipment similar to that described in connection with FIG. 1. A vacuum storage tank 52 and a clean water storage tank 54 are provided, and they are used in the same manner as previously described. A vacuum system 56 creates a vacuum as described above, and heater/compressor units 58 provide water heated to approximately 175 degrees F. under high pressure. If desired or needed, additional clean water storage can be provided next to storage tank 54. Valves and pipes similar to those shown in FIG. 1 are provided, but not shown in FIG. 2.

A vacuum hood 60 can be provided at the rear of the truck, and preferably lowered and hoisted out of the way as needed. If desired, hand held units (not shown) can by provided to perform the cleaning and vacuuming steps, but a larger, heavier duty system such as described above is preferred.

Figure 3:
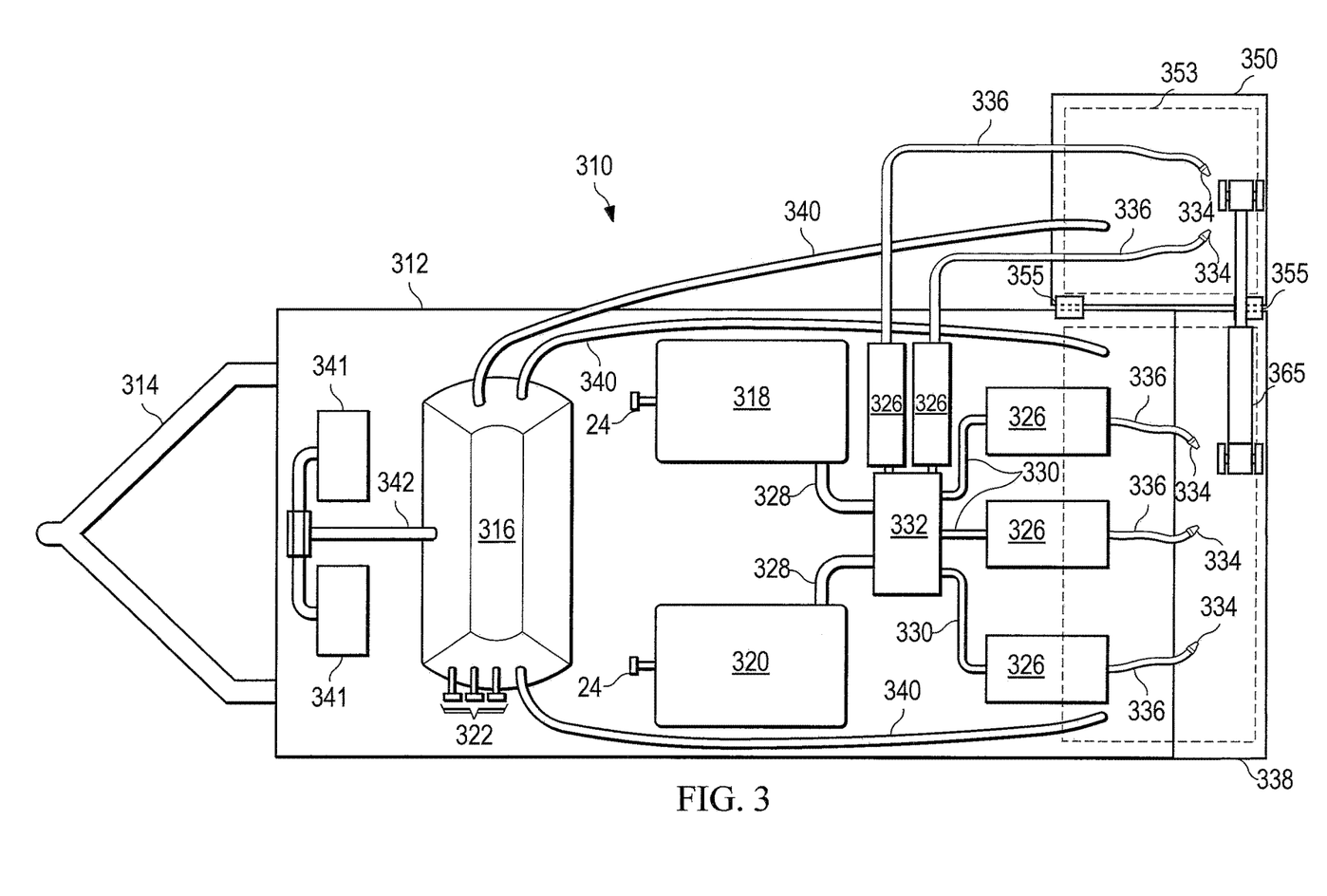
FIG. 3 is a plan diagram of a trailer with an extension according to the present application.

As shown in FIG. 3, a trailer mounted cleaning system 310 in accordance with the present application includes a bed 312 on which equipment is located, and a tow hitch 314 for pulling the trailer in the normal way. This embodiment of a cleaning system includes a single vacuum storage tank 316 having walls thick enough to withstand atmospheric pressure against a vacuum. Clean water storage tanks 318, 320 are used to store and provide clean water used in the cleaning process Preferably, vacuum storage tank 316 has a capacity of approximately 500 gallons, but any other size that will be suitable for a particular task may be used. Several valves 322 are provided on the vacuum storage tank 316 so that liquid and small debris can be removed, and the system purged as needed. During use, if the storage tank 316 should become filled, the vacuum can be released and the liquid and debris pumped out of the valves 322 into one or more waste storage tanks (not shown) for removal.

Clean water storage tanks 318 and 320 may have a capacity of approximately 325 gallons each, although other volumes can be used if desired. Also, while two tanks are shown in the drawing as suitable for use due to weight balancing reason, one tank, or more than two tanks, can be used if desired. Tanks 318, 320 are also provided with valves 24 by which the tanks can easily be refilled if needed.

Five heater/compressor units 326 are connected to the water storage tanks 318, 320 by an arrangement of pipes (or hoses) 328, 330 and valves 332 that enable water to be supplied to the units 326 on demand. Units 326 heat incoming water to approximately 150-200 degrees F. (slightly below boiling so that steam is not generated) and provide it under a pressure of at least approximately 3,500 psi to washer unit nozzles 334 though high pressure hoses 336. Five high pressure nozzles 334 are shown in the drawing, but any suitable number can be used. These nozzles provide a relatively uniform spray at high pressure down to the surface on which the trailer is rolling, enabling hot water to penetrate beneath the porous surface.

The high pressure spray can be created by directing water at preferably 3,500 lbs/square inch or greater into three bearing, spinning them and creating the super agitation necessary to complete the removal process. Other set-ups that provide a high pressure water spray can also be used. The bearings used to generate the high pressure spray are incorporated into a retractable vacuum hood 338 which is lowered close to the ground, and includes a skirt to prevent water and other material from escaping. Also connected to the vacuum hood 338 are several vacuum lines 340 that are used to retrieve water, organic liquids, and other debris, and return them to vacuum storage tank 316. These materials are vacuumed away at the same time as water is being sprayed under high pressure into the contaminated surface; this ensures that these materials do not escape from underneath the hood.

Vacuum is created on the vacuum storage tank by one or more vacuum systems 341 connected to tank 316 by suitable piping 342. A single system can be used if desired; two vacuum systems 341 provide backup and system operability in case of a single system failure. Preferably, one or more generators are provided (not shown) to power the equipment described above, although any other desired means for providing power can be used.

As an improvement over system 10, system 310 includes an extension 350. Extension 350 with a skirt 353 is hingeably connected to the trailer 312 by a series of hinges 355. This allows the extension 350 to be folded in and out as needed by the user. This allows a user to clean a larger surface area when the need arises. For example, during clean up of an automobile accident, the extension allows a lane and a median to be cleaned concurrently. The user has the ability to actuate actuator 365 to fold and unfold the extension 350. Typically while the extension 350 is unused the extension is nearly perpendicular to the surface of the bed 312. Valves are used by the system 310 to isolate the vacuum and high pressure lines from the rest of the system when the extension is unused. The valves are controlled by sensing the position of the extension 350, such that when the extension 350 is unfolded the vacuum and pressure lines are opened for use, alternatively the valves are mechanically controlled.

Figure 4:
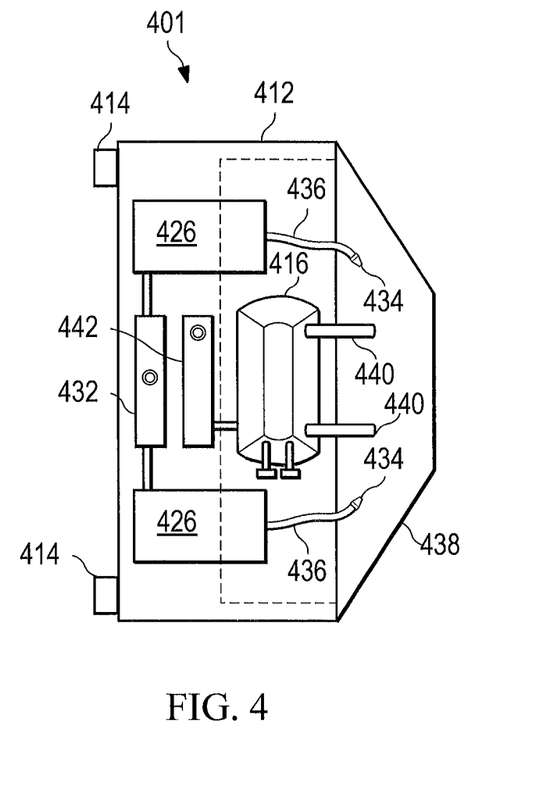
FIG. 4 is a plan diagram of a nose mounted platform for use with a vacuum truck according to the present application.

Referring now also to FIG. 4 in the drawings, an alternative embodiment of a vacuum truck mounted apparatus for cleaning spills 401 according to the present application is illustrated. Some users of the system might already have a vacuum truck and need a system to utilize existing equipment. System 401 is configured for mounting to a truck that contains a vacuum system and stores water. Therefore, system 401 doesn't need the vacuum system and fresh water storage tanks such as were needed in system 10. Coupled to the vacuum system of the truck is a vacuum line typically coiled at the end of the truck for applying a vacuum a distance away from the truck. Additionally, the truck includes a hose from the fresh water storage tanks to allow fresh water at a distance from the truck. Platform 412 includes attachments 414 capable of securing the platform 412 to the vacuum truck. Preferably platform 412 is mounted to the front of the vacuum truck however the system can be mounted to rear of the vacuum truck.

Located on the platform 412 is a fresh water interconnect 432 holding couplings, valves, and tubing required to couple the existing water supply, for example the fresh water hose, of the vacuum truck to the system 401. Coupled to the fresh water interconnect 432 are a pair of heater/compressor units 426 that enable water to be supplied to the units 426 on demand. Units 426 heat incoming water to approximately 150-200 degrees F. (slightly below boiling so that steam is not generated) and provide it under a pressure of at least approximately 3,500 psi to washer unit nozzles 434 though high pressure hoses 436. Two high pressure nozzles 434 are shown in the drawing, but any suitable number can be used. These nozzles provide a relatively uniform spray at high pressure down to the surface on which the trailer is rolling, enabling hot water to penetrate beneath the porous surface.

The high pressure spray can be created by directing water at preferably 3,500 lbs/square inch or greater into two bearing, spinning them and creating the super agitation necessary to complete the removal process. Other set-ups that provide a high pressure water spray can also be used. The bearings used to generate the high pressure spray are incorporated into a retractable vacuum hood 438 which is lowered close to the ground, and includes a skirt to prevent water and other material from escaping. Also connected to the vacuum hood 438 are several vacuum lines 440 that are used to retrieve water, organic liquids, and other debris, and return them to vacuum storage tank 416. These materials are vacuumed away at the same time as water is being sprayed under high pressure into the contaminated surface; this ensures that these materials do not escape from underneath the hood. Coupled to the vacuum storage tank 416 is a vacuum system interconnect 442. Vacuum system interconnect 442 includes a series of couplings, valves, and tubing to allow the system 401 to utilize the existing vacuum system of the vacuum truck by attaching the vacuum hose of the truck to the system. Preferably vacuum system interconnect 442 includes a one way valve so that the vacuum storage tank 416 remains under a vacuum if the vacuum truck's vacuum system is removed or turned off. This prevents accidental spillage of the contents of vacuum storage tank 416.

Typically a user of system 401 would attach the platform 412 to the truck and then connect the fresh water system to the fresh water interconnect 432 and the vacuum system of the truck to the vacuum system interconnect 442. Then the system 401 becomes an extension of the vacuum truck. Controls for the system 401 are preferably wirelessly provided to the driver of the truck. Alternately, system 401 includes sensors such that when the driver starts to pump water from the truck into the system 401, the heater units 426 and the vacuum system starts up to spray and clean the hard surface.

The system and method described herein is extremely useful for cleaning fuel and similar spills on concrete and other hard surfaces. Similar materials, such as paint and organic solvents can be cleaned in this manner. In all cases, the dirty water and other liquids are vacuumed up from the surface and temporarily stored in the holding tank, then transferred to other specified waste containers for transport and disposal.

Figure 5:
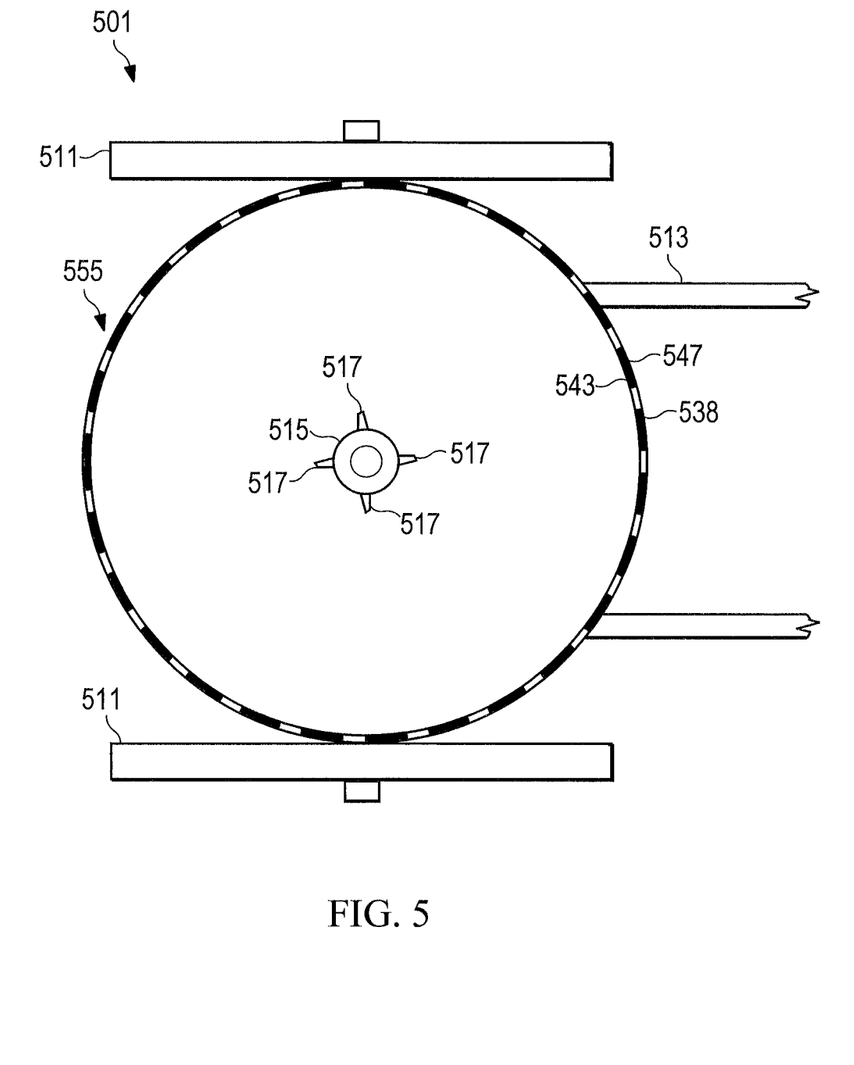
FIG. 5 is a view looking upwards of a walk along embodiment according to the present application.

Referring now also to FIG. 5 in the drawings, a preferred embodiment of a walk behind apparatus for cleaning spills 501 according to the present application is illustrated. FIG. 5 is a plan view looking upwards from underneath the apparatus 501. Apparatus 501 is configured for use in conjunction with systems 10, 310, or 401 to allow a user to clean a hard surface where there is not enough space for a trailer mounted system. Apparatus 501 includes a pair of wheels 511 configured to allow it to be rolled around and moved similar to that of a lawn mower with a handle 513. Apparatus 501 includes a bearing 515 with a plurality of nozzles 517 so that the high pressure spray can be created by directing water at preferably 3,500 lbs/square inch or greater into the bearing 515, spinning it and creating the super agitation necessary to complete the removal process. The bearing 515 used to generate the high pressure spray is incorporated into a vacuum hood 538. The vacuum hood is comprised of an inner hood surface 543, an outer hood surface 547, a plurality of channels 555 between the inner hood surface 543 and the outer hood surface 547. The vacuum hood 538 includes a skirt (not shown) to prevent water and other material from escaping. Also connected to the vacuum hood 538 is a vacuum line (not shown) used to retrieve water, organic liquids, and other debris through the channels 555, and return them to vacuum storage tank (not shown). These materials are vacuumed away at the same time as water is being sprayed under high pressure into the contaminated surface; this ensures that these materials do not escape from underneath the hood. It should be apparent that apparatus 501 could be provided with a power supply, a water system, and a vacuum system to be self contained.

Figure 6:
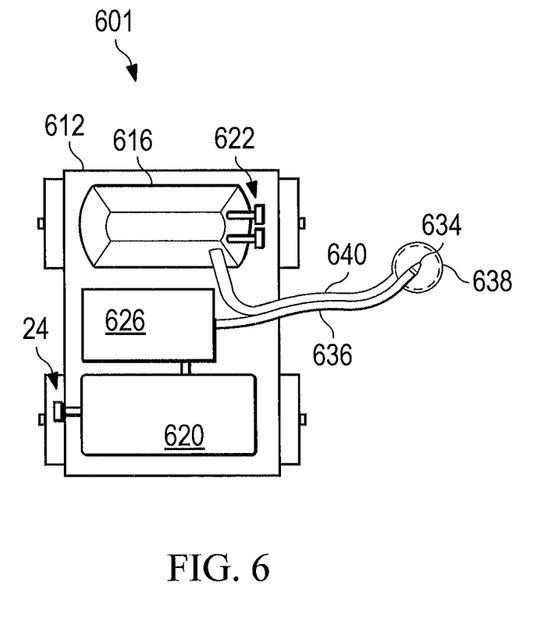
FIG. 6 is a plan diagram of a cart mounted version according to the present application.

Referring now also to FIG. 6 in the drawings, an alternative embodiment of a cart based apparatus for cleaning spills 601 according to the present application is illustrated. As shown in FIG. 6, a cart mounted cleaning system 601 with four wheels in accordance with the present application includes a bed 612 on which equipment is located. This embodiment of a cleaning system includes a single vacuum storage tank 616 having walls thick enough to withstand atmospheric pressure against a vacuum. Clean water storage tank 620 is used to store and provide clean water used in the cleaning process Preferably, vacuum storage tank 616 has a capacity of approximately 200 gallons, but any other size that will be suitable for a particular task may be used. Several valves 622 are provided on the vacuum storage tank 616 so that liquid and small debris can be removed, and the system purged as needed. During use, if the storage tank 616 should become filled, the vacuum can be released and the liquid and debris pumped out of the valves 622 into one or more waste storage tanks (not shown) for removal.

Clean water storage tanks may have a capacity of approximately 200 gallons each, although other volumes can be used if desired. Tank 620 is also provided with valves 24 by which the tanks can easily be refilled if needed.

One heater/compressor unit 626 is connected to the water storage tanks 620 by an arrangement of pipes that enable water to be supplied to the units 626 on demand. Unit 626 heat incoming water to approximately 150-200 degrees F. (slightly below boiling so that steam is not generated) and provide it under a pressure of at least approximately 3,500 psi to washer unit nozzle 634 though high pressure hoses 636. This nozzle provides a relatively uniform spray at high pressure down to the surface on which the cart is rolling, enabling hot water to penetrate beneath the porous surface.

The high pressure spray can be created by directing water at preferably 3,500 lbs/square inch or greater into one bearing, like bearing 515, spinning it and creating the super agitation necessary to complete the removal process. Other set-ups that provide a high pressure water spray can also be used. The bearing used to generate the high pressure spray in incorporated into a vacuum hood 638 which is held close to the ground, and includes a skirt to prevent water and other material from escaping. Also connected to the vacuum hood 638 is a vacuum line 640 used to retrieve water, organic liquids, and other debris, and return them to vacuum storage tank 616. These materials are vacuumed away at the same time as water is being sprayed under high pressure into the contaminated surface; this ensures that these materials do not escape from underneath the hood.

Vacuum is created on the vacuum storage tank by one or more vacuum systems (not shown) connected to tank 616 by suitable piping. A single system can be used if desired; two vacuum systems provide backup and system operability in case of a single system failure. Preferably, power from a standard wall outlet is used to power the equipment described above, although any other desired means for providing power can be used.

System 601 is suitable for use in high rise buildings where cleaning hard surfaces presents difficulties such as restrooms. The liquid recovered presents hazards if spilled by the cleaning staff. Using system 601, where the contents are held under a vacuum, users can be assured that the noxious contents will not be spilled until properly disposed of.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

The invention claimed is:

1. A mobile system for using water to clean an organic spill from a contaminated hard surface, the mobile system comprising:
   a mobile platform operably mounted on wheels for movement across the contaminated hard surface, the mobile platform having a width;
   at least one clean water storage tank mounted on the mobile platform for storing the water;
   a cleaning hood operably mounted on the mobile platform such that the cleaning hood may be positioned immediately above the contaminated hard surface, the cleaning hood extending across substantially the entire width of the mobile platform;
   at least one heater compressor unit for heating water from the at least one clean water storage tank, compressing the water to at least 3,500 psi, and spraying the water through nozzles positioned within the cleaning hood, so that the water is directed onto the contaminated hard surface under the cleaning hood;
   a waste water storage tank mounted on the mobile platform, and isolated from the at least one clean water storage tank, so that no water from the waste water storage tank contaminates the water in the at least one clean water storage tank;
   a vacuum generator for generating a vacuum in the waste water storage tank;
   wastewater lines extending between the waste water storage tank and the cleaning hood, so that contaminated water from the contaminated hard surface is drawn into the waste water storage tank, and an extension hingedly coupled to the mobile platform;
wherein the waste water storage tank is held in a constant state of negative pressure to prevent spillage.

2. The mobile system according to claim 1, wherein the at least one heater compressor unit heats the water to just below the boiling point of water.

3. The mobile system according to claim 1, the extension comprising:
   an extended cleaning hood operably mounted on the extension, the extended cleaning hood extending across substantially the entire width of the extension;
   nozzles positioned within the extended cleaning hood, so that the water is directed onto the contaminated hard surface under the extended cleaning hood; and
   extended wastewater lines extending between the waste water storage tank and the extended cleaning hood, so that contaminated water from the contaminated hard surface is drawn into the waste water storage tank.

4. The mobile system according to claim 3, the further comprising:
   an actuator coupled between the mobile platform and the extension for allowing the extension to rotate relative to the mobile platform.

5. The mobile system according to claim 1, further comprising:
   an attachment for small area cleaning having;
      a nozzle in fluid connection with the least one heater compressor unit; and
      a vacuum hood for containing a spray of fluid from the nozzle;
   wherein the vacuum hood is in fluid connection with the waste water storage tank.

6. The mobile system according to claim 5, wherein the vacuum hood includes a plurality of channels.

* * * * *